Sept. 12, 1939.  J. ROPER  2,173,043
DETACHABLE WHEEL FOR VEHICLES
Filed Oct. 5, 1936
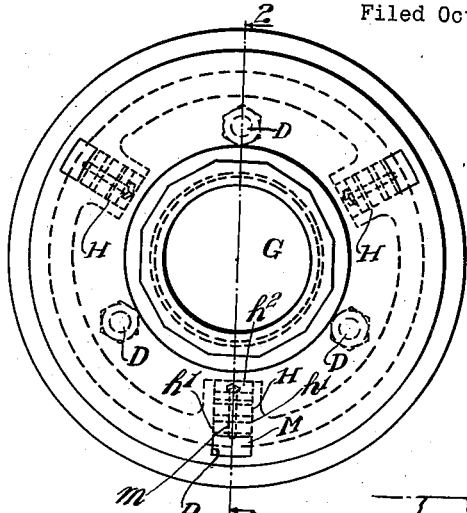
Fig. 1.
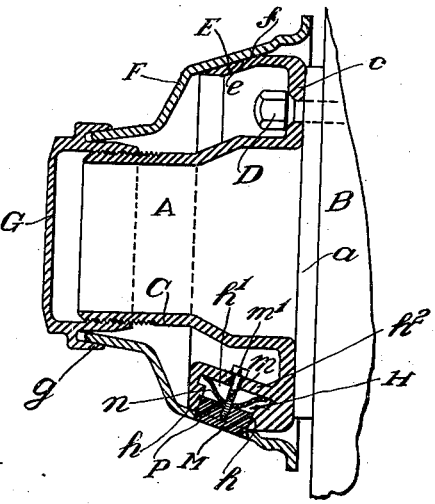
Fig. 2.
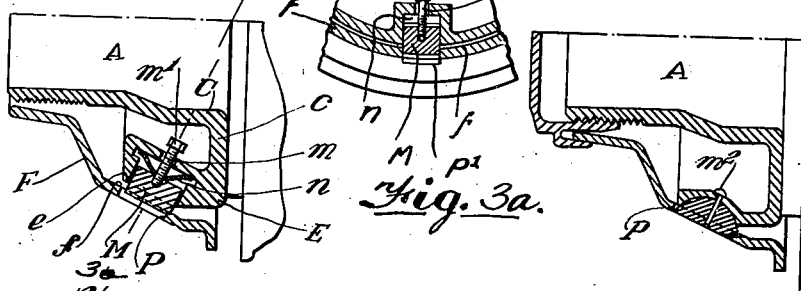
Fig. 3.   Fig. 3a.   Fig. 4.
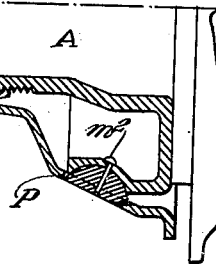
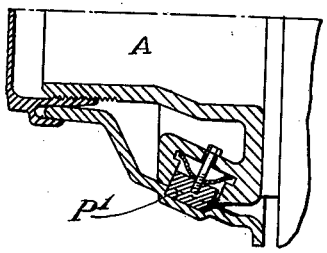
Fig. 5.
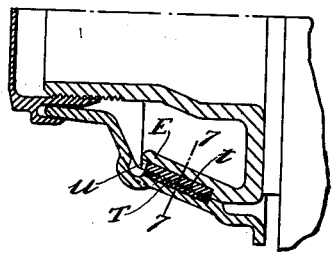
Fig. 6.
Fig. 7.
INVENTOR
JOHN ROPER
By Norris & Bateman
ATTORNEYS Patented Sept. 12, 1939

2,173,043

UNITED STATES PATENT OFFICE 2,173,043

DETACHABLE WHEEL FOR VEHICLES

John Roper, Solihull, Birmingham, England, assignor to William Herbert Jordan, London, England Application October 5, 1936, Serial No. 104,127
In Great Britain October 18, 1935

3 Claims. (Cl. 301—9)

The invention relates to detachable vehicle wheels of the type in which the outer or wheel hub has a conical portion the smaller end of which is presented forwardly or outwardly, said portion being adapted to fit upon a correspondingly coned portion of the permanent hub or a part secured in relation thereto and so as to turn therewith, the two conical parts being provided with depressions and projections which fit into one another when the conical parts are engaged, and means being provided for pressing or forcing the two conical portions together.

The object of this invention is to effect improvements in the above type of wheel with a view to providing a construction which will permit either or both of the engaging conical faces to be machined so as to ensure a perfect fit of the one part on the other, and to ensure against there being any turning movement between the parts.

According to the invention, the conical portion of the wheel or outer hub is so formed that its inner surface is entirely clear of projections, that is to say the metal thereof is not pressed inwardly but there is formed in such conical portion a hole or holes or a pressed-out recess or recesses and each such hole or recess is preferably square or rectangular. The conical portion of the inner part, that is to say the part which is secured in relation to the permanent hub, has a corresponding hole or recess pressed inwardly or set of holes or recesses. In each of the holes or recesses in one of the conical surfaces, is fitted a correspondingly shaped block adapted to extend outwardly or inwardly (as the case may be) of the respective surface and enter the corresponding hole or recess in the other conical surface.

The blocks may be rigidly secured in the recesses or they may be set therein in such a manner that they yield back against the force of suitable springs as the outer conical portion is put over the inner and then snap into the respective holes or recesses in the other surface. Each block may be slanted off at the inner end of its outward face whereby engagement therewith of the inner edges of the holes or recesses in the other conical part will cause such spring pressed blocks to move in and allow the outer conical part to be drawn off the inner. In the case of fixed blocks the leading edges of the holes or recesses in the outer or inner coned part must be so disposed that they will clear the blocks, as such outer coned part is being put on over said inner coned part.

The sides of each block may be slightly inclined so as to secure a wedging action of the block in the respective hole and thus prevent any turning movement of the one conical part over the other.

The above construction allows either or both of the conical surfaces to be machined to ensure an accurate fit, the one conical surface being machined before the blocks are inserted.

The inner conical portion may be a part of the inner hub or it may be a part which is secured in relation to the inner hub or to the brake drum such as by the securing bolts of an existing wheel hub or by bolts specially provided to secure the said part. This latter part may have a forward tubular extension screwed at its outer end to receive a nut which by bearing on the outer end of the outer conical part affords the means for securing the wheel in place.

Convenient embodiments of the invention are described with reference to the drawing herewith of which—

Figure 1 is a front elevation of wheel hub constructed according to the invention.

Figure 2 is a section taken on the line 2, 2, of Figure 1.

Figure 3 is a fragmentary section to illustrate the outer coned surface just before it is fully engaged with the inner coned surface.

Fig. 3ᵃ is a detail section taken on the line 3ᵃ—3ᵃ in Fig. 3.

Figure 4 is a fragmentary view in section to illustrate a modification.

Figure 5 is a fragmentary view in section to illustrate a further modification.

Figure 6 is a fragmentary view in section to illustrate a further modification; and, Figure 7 is a section taken in the plane indicated by the line 7, 7, of Figure 6.

Referring first to Figures 1, 2, and 3, A represents the permanent hub of a wheel. It has a flange $a$ and brake drum B (shown broken away). C is an inner member adapted to fit over the hub A and having an inner end wall $c$ which has holes through which are passed studs D screwing into the flange $a$, brake drum B or into nuts (not shown) provided in the brake drum, such studs serving to secure the inner member C permanently on the permanent hub. Extending forwardly from the wall $c$ to a point approximately midway of the length of the inner member C is an annular wall E having formed on its outer periphery a coned surface $e$ which has its least diameter presented forwardly. F is an outer member having a coned inner surface $f$ which is the counterpart of the surface $e$.

The outer end of the inner member C has an exterior screw thread to receive a nut G which has an internally coned surface $g$ adapted to engage on a correspondingly coned external surface at the front end of the outer member F. Thus, when the outer member is placed over the inner and the nut screwed up, the two members, by their meeting coned surfaces, are forced into intimate contact.

In the wall E of the inner member there is a series of pockets or chambers H each having end walls $h$ $h$, side walls $h'$ $h'$ and an inner wall $h^2$. In the recess is fitted a rectangular block M guided partly by the walls $h$ $h$ and $h'$ $h'$ and partly by a set pin $m$ which is screwed into the block. This set pin is passed through the wall $h^2$. It has a head $m'$ which, by coming against the outer face of the wall $h^2$, limits the outward radial movement of the block. $n$ is a plate spring of bow shape placed between the block and the wall $h^2$ and serving constantly to press the block in an outward direction. It has a hole to allow the pin $m$ to pass freely through it.

The outer member F has formed through it rectangularly shaped holes P placed so that they will all coincide at once with the blocks M. When the outer member is presented to the inner member, the inner coned surface of the outer member presses in the blocks against the force of the springs until the blocks spring into the holes P. This locates the outer member in angular relationship to the inner and also serves as temporary means for retaining the wheel. To facilitate the engagement, the rear outer edges of the blocks and the rear edges of the holes may be chamfered as indicated. The wheel is of course secured by the nut G acting through the coned surface $g$ and the engagement of these surfaces acts as locking means for the nuts. The blocks may be slightly tapered to give a wedging action.

Referring to Figure 4 the construction is similar but the blocks are of half moon shape and are rigidly fixed in position by rivets $m^2$. In this case the rear edges of the holes P and the rear edges of the blocks are sufficiently chamfered to allow the outer member to clear, and to be passed on over the blocks until they enter the holes P. The blocks only locate the outer member in angular relationship to the inner member and do not serve as temporary retaining means.

Referring to Figure 5 the construction is similar to Figures 1, 2, and 3, but instead of forming holes P, recesses P' are formed by pressing back the metal of the outer member. Such pressing is performed before the inner surface is machined, and the recesses do not interfere with subsequent machining. An outer member having recesses as above described may be used in conjunction with blocks fixed as shown in Figure 4.

Referring to Figures 6 and 7, recesses T are pressed outwardly from the outer conical surface before machining, and in them are secured blocks $t$ after the surface has been machined. The blocks may be secured in the recesses by welding, and they engage in recesses $u$ these being carried out to the front edge of the wall E to allow of the removal of the outer member F.

I claim:

1. In combination, inner and outer wheel hub members adapted to be pressed together axially, and means on said members to prevent relative rotation thereof while permitting them to be pulled apart, said means comprising at least one block carried by one of said members, a recess complemental to the block in the other of said members, and spring means for urging said block into said recess, said hub member provided with the recess having a surface for engaging a surface of the block in response to axial separation of said members to overcome the spring means and retract the block from the recess.

2. In the combination defined in claim 1, means for securing the block in position on the member which carries it, said securing means including a stop element for limiting the spring action when the recessed member is removed.

3. In combination, an inner wheel hub member composed of a shell having axially inner and outer ends, an external screw thread formed on the axially outer end of said shell, a flange integral with and extending radially from the axially inner end of said shell, and an annular member integral with and extending substantially axially from the outer edge of said flange over and in spaced relation from and towards the axially outer end of said shell to approximately midway of its length and formed with an external frusto-conical bearing surface, an outer hub member comprising a shell having an open axially inner end of larger diameter and an open axially outer end of smaller diameter than said annular member and formed with an internal frusto-conical surface complemental to and designed to receive said external frusto-conical bearing surface, one of said frusto-conical surfaces having a recess therein, a block located on the other of said frusto-conical surfaces and engageable in said recess, and securing means engaging said external screw thread and engageable with the axially outer end of said outer hub member.

JOHN ROPER.